United States Patent
Sugiyama

(10) Patent No.: US 10,255,007 B2
(45) Date of Patent: Apr. 9, 2019

(54) IMAGE PROCESSING MACHINE

(71) Applicant: RISO KAGAKU CORPORATION, Tokyo (JP)

(72) Inventor: Yoshifumi Sugiyama, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/883,646

(22) Filed: Jan. 30, 2018

(65) Prior Publication Data

US 2018/0225070 A1 Aug. 9, 2018

(30) Foreign Application Priority Data

Feb. 3, 2017 (JP) ................................ 2017-018144

(51) Int. Cl.
| | | |
|---|---|---|
| H04N 1/04 | (2006.01) | |
| G06F 3/12 | (2006.01) | |
| H04N 1/00 | (2006.01) | |
| H04N 1/21 | (2006.01) | |

(52) U.S. Cl.
CPC .......... *G06F 3/1212* (2013.01); *G06F 3/1221* (2013.01); *G06F 3/1242* (2013.01); *G06F 3/1267* (2013.01); *G06F 3/1271* (2013.01); *G06F 3/1279* (2013.01); *H04N 1/00822* (2013.01); *H04N 1/2104* (2013.01); *H04N 2201/0094* (2013.01); *Y02D 10/1592* (2018.01)

(58) Field of Classification Search
CPC ............. H04N 1/00822; H04N 1/2104; H04N 2201/0094
USPC ....................................................... 358/1.15
See application file for complete search history.

(56) References Cited

U.S. PATENT DOCUMENTS

| | | | | |
|---|---|---|---|---|
| 2010/0271657 A1* | 10/2010 | Morales | ................ | G06F 3/1205 358/1.15 |
| 2011/0199639 A1* | 8/2011 | Tani | ..................... | G03G 15/502 358/1.15 |
| 2012/0120444 A1* | 5/2012 | Hirohata | ............ | G06K 9/00449 358/1.15 |

FOREIGN PATENT DOCUMENTS

| | | |
|---|---|---|
| JP | 2008-78757 A | 4/2008 |
| JP | 2012-238318 A | 12/2012 |
| JP | 2014-230211 A | 12/2014 |

* cited by examiner

*Primary Examiner* — Houshang Safaipour
(74) *Attorney, Agent, or Firm* — Greenblum & Bernstein, P.L.C.

(57) ABSTRACT

A printing machine includes a scanning unit, a storing unit, a determination section, and an editing section. The scanning unit reads a set of original images from an original composed of a plurality of pages and reads a set of editing images from an original-for-editing for editing the original. The storing unit stores the read set of original images and the read set of editing images in units of pages. When an editing mode is set, the determination section determines whether or not there are original images that correspond to a first editing image which is a first page and a last editing image which is a last page of the original-for-editing stored in the storing unit, among the set of original images stored in the storing unit. The editing section edits the set of original images using the set of editing images based on a result of the determination.

5 Claims, 10 Drawing Sheets

FIG. 5A

| ORIGINAL IMAGES BEFORE EDITING | 1 | 2 | 3 | 4 | 5 | 6 | 7 | 8 | 9 | 10 | | |
|---|---|---|---|---|---|---|---|---|---|---|---|---|
| ORIGINAL TO BE ADDED | A | B | | | | | | | | | | |
| ORIGINAL-FOR-EDITING | A | B | | | | | | | | | | |
| ORIGINAL IMAGES AFTER EDITING | 1 | 2 | 3 | 4 | 5 | 6 | 7 | 8 | 9 | 10 | A | B |

FIG. 5B

| ORIGINAL IMAGES BEFORE EDITING | 1 | 2 | 3 | 4 | 5 | 6 | 7 | 8 | 9 | 10 |
|---|---|---|---|---|---|---|---|---|---|---|
| ORIGINAL TO BE REPLACED | A | B | C | D | E | | | | | |
| ORIGINAL-FOR-EDITING | 5 | A | B | C | D | E | | | | |
| ORIGINAL IMAGES AFTER EDITING | 1 | 2 | 3 | 4 | 5 | A | B | C | D | E |

FIG. 5C

| ORIGINAL IMAGES BEFORE EDITING | 1 | 2 | 3 | 4 | 5 | 6 | 7 | 8 | 9 | 10 |
|---|---|---|---|---|---|---|---|---|---|---|
| ORIGINAL TO BE REPLACED | A | B | | | | | | | | |
| ORIGINAL-FOR-EDITING | 2 | A | B | 6 | | | | | | |
| ORIGINAL IMAGES AFTER EDITING | 1 | 2 | A | B | 6 | 7 | 8 | 9 | 10 | |

FIG. 5D

| ORIGINAL IMAGES BEFORE EDITING | 1 | 2 | 3 | 4 | 5 | 6 | 7 | 8 | 9 | 10 |
|---|---|---|---|---|---|---|---|---|---|---|
| ORIGINAL TO BE DELETED | 3 | 4 | 5 | | | | | | | |
| ORIGINAL-FOR-EDITING | 2 | 6 | | | | | | | | |
| ORIGINAL IMAGES AFTER EDITING | 1 | 2 | 6 | 7 | 8 | 9 | 10 | | | |

FIG. 5E

| ORIGINAL IMAGES BEFORE EDITING | 1 | 2 | 3 | 4 | 5 | 6 | 7 | 8 | 9 | 10 |
|---|---|---|---|---|---|---|---|---|---|---|
| ORIGINAL TO BE REPLACED | A | B | C | D | E | | | | | |
| ORIGINAL-FOR-EDITING | A | B | C | D | E | 6 | | | | |
| ORIGINAL IMAGES AFTER EDITING | A | B | C | D | E | 6 | 7 | 8 | 9 | 10 |

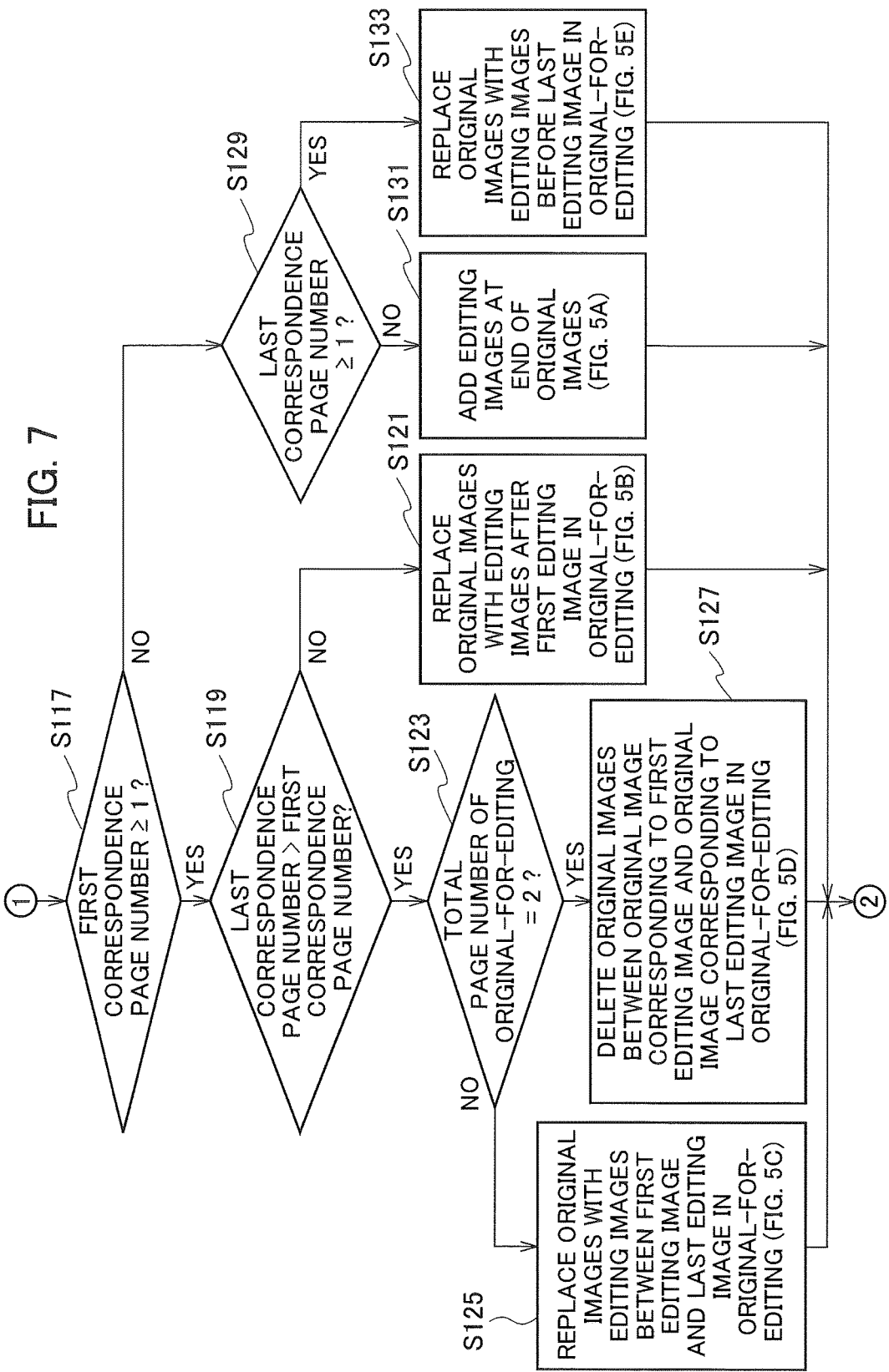

FIG. 8A

ORIGINAL EDITING
- ↶ FOLDER
- 🔍 DETAILS CONFIRMATION

SELECT ORIGINAL TO BE EDITED AND ORIGINAL-FOR-EDITING

| | LIST OF ORIGINALS | NUMBER OF SELECTION | 1 |

NUMBER OF COPIES  1

CANCEL | ENTER

| | DOCUMENT NAME | | NUMBER OF PAGES |
|---|---|---|---|
| 📄 | SCHOOL NEWSLETTER | | 05 |
| 📄 | ORIGINAL(PARTIAL EDITING OBJECT) | | 10 ✓ |
| 📄 | ANNOUNCEMENT OF MUSIC CONCERT | | 02 |
| 📄 | OUTLINE OF PAINTING COMPETITION | | 05 |
| 🔒 | ORIGINAL-FOR-EDITING | | 02 |
| 📄 | (EMPTY JOB) | | |

CANCEL | ENTER

PAGE BEFORE EDITING? / PAGE AFTER EDITING

EDITING CONTENTS   ✗ (NOT SELECTED)

PAGE SELECTION BUTTONS: 0 1 2 3 4 5 6 7 8 9

| (JOB ORIGINAL BEFORE EDITING) | 1 | 2 | 3 | 4 | 5 | 6 | 7 | ⋯ | 10 |
| (JOB ORIGINAL-FOR-EDITING) | A | B |
| (PAGE IMMEDIATELY BEFORE EDITING) | 10 |
| (PAGE IMMEDIATELY AFTER EDITING) | ✗ (NOT SELECTED) |
| (JOB ORIGINAL AFTER EDITING) | 1 | 2 | 3 | 4 | 5 | 6 | 7 | ⋯ | 10 | A | B |

FIG. 9A

| JOB ORIGINAL BEFORE EDITING | 1 | 2 | 3 | 4 | 5 | 6 | 7 | 8 | 9 | 10 |
|---|---|---|---|---|---|---|---|---|---|---|
| JOB ORIGINAL-FOR-EDITING | A | B | | | | | | | | |
| PAGE IMMEDIATELY AFTER EDITING | 10 | | | | | | | × (NOT SELECTED) | | |
| PRINTOUT | 1 | 2 | 3 | 4 | 5 | 6 | 7 | 8 | 9 | 10 | A | B |

FIG. 9B

| JOB ORIGINAL BEFORE EDITING | 1 | 2 | 3 | 4 | 5 | 6 | 7 | 8 | 9 | 10 |
|---|---|---|---|---|---|---|---|---|---|---|
| JOB ORIGINAL-FOR-EDITING | A | B | | | | | | | | |
| PAGE IMMEDIATELY AFTER EDITING | 5 | | | | | | | × (NOT SELECTED) | | |
| PRINTOUT | 1 | 2 | 3 | 4 | 5 | A | B |

FIG. 9C

| JOB ORIGINAL BEFORE EDITING | 1 | 2 | 3 | 4 | 5 | 6 | 7 | 8 | 9 | 10 |
|---|---|---|---|---|---|---|---|---|---|---|
| JOB ORIGINAL-FOR-EDITING | A | B | | | | | | | | |
| PAGE IMMEDIATELY AFTER EDITING | 3 | | | | | | 7 | | | |
| PRINTOUT | 1 | 2 | 3 | A | B | 7 | 8 | 9 | 10 |

FIG. 9D

| JOB ORIGINAL BEFORE EDITING | 1 | 2 | 3 | 4 | 5 | 6 | 7 | 8 | 9 | 10 |
|---|---|---|---|---|---|---|---|---|---|---|
| JOB ORIGINAL-FOR-EDITING | [EMPTY JOB SELECTED] | | | | | | | | | |
| PAGE IMMEDIATELY BEFORE EDITING | 3 | | | | | | PAGE IMMEDIATELY AFTER EDITING 7 | | | |
| PRINTOUT | 1 | 2 | 3 | 7 | 8 | 9 | 10 |

FIG. 9E

| JOB ORIGINAL BEFORE EDITING | 1 | 2 | 3 | 4 | 5 | 6 | 7 | 8 | 9 | 10 |
|---|---|---|---|---|---|---|---|---|---|---|
| JOB ORIGINAL-FOR-EDITING | A | B | | | | | | | | |
| PAGE IMMEDIATELY BEFORE EDITING | × (NOT SELECTED) | | | | | | PAGE IMMEDIATELY AFTER EDITING 4 | | | |
| PRINTOUT | A | B | 4 | 5 | 6 | 7 | 8 | 9 | 10 |

IMAGE PROCESSING MACHINE

CROSS REFERENCE TO RELATED APPLICATION

This application claims benefit of priority under 35 U.S.C. § 119 to Japanese Patent Application No. 2017-018144, filed on Feb. 3, 2017, the entire contents of which are incorporated by reference herein.

BACKGROUND OF THE INVENTION

1. Field of the Invention

The present invention relates to an image processing machine that performs partial editing with saving electric power and improving efficiency.

2. Description of the Related Art

The use of an automatic original reading machine that optically reads image data on an original as original images has been widespread. Moreover, the use of an image processing machine has been widespread, such as a copying machine that includes the automatic original reading machine as a scanning part and prints out (copy) the original images read by the scanning part on media such as paper. As the image processing machine, a printing machine that prints out original images, for example, sent from a personal computer (PC) through a network, on media has been put to practical use. Moreover, as the image processing machine, a digital multifunctional machine (MFP) that has printing, copying, and faxing functions has been put to practical use. Furthermore, an image processing machine that previously stores original images sent from a PC and original images read by the scanning part as job originals-for-printing and prints them out on media as necessary has been developed.

On such image processing machines, when performing partial editing of read original images, it has been necessary to reread the whole of original to recreate original images until now. When the original is over many pages, it is necessary to reread original images having no need of being edited. This is very inefficient.

In this situation, as the image processing machine, machines capable of performing partial editing of original images have been developed (refer to Patent Literature 1: Japanese Patent Application Laid-Open No. 2008-078757, Patent Literature 2: Japanese Patent Application Laid-Open No. 2012-238318, and Patent Literature 3: Japanese Patent Application Laid-Open No. 2014-230211, for example).

A technique described in Patent Literature 1 includes an image editing program to simplify user's operations. For example, from two continuous pages corresponding to a cut out range, a part of the former page and a part of the latter page are taken out from original images, and an output image is generated on the basis of images within a taken-out range.

In Patent Literature 2, document data is displayed in a tree structure in units of chapters when a preview of the document data is displayed. Patent Literature 2 discloses a technique for a display capable of improving efficiency in editing operations.

An image forming machine described in Patent Literature 3 displays plural preview images regarding an image forming operation, which are over plural pages, on a touch panel in parallel with the image forming operation, and performs an editing operation, such as deleting a page, in response to a gesture operation including a flick operation toward a preview image being displayed.

The techniques disclosed in the above-described Patent Literatures 1 and 2 solve the problem of rereading original images having no need of being edited. The techniques however require much time to search for an original image to be edited when original images are over many pages. Moreover, an editing operation becomes complicated when having a lot of original images to be edited.

In particular, in the technique disclosed in Patent Literature 3, it is possible to delete a specified page image, but not possible to perform partial editing such as an addition of new original images.

SUMMARY OF THE INVENTION

The present invention is made in view of the above discussion. An object of the present invention is to provide an image processing machine that reduces works and time required for partial editing of a set of original images to improve efficiency, and reduces electric power consumption in the partial editing of an original.

To achieve the above-described object, according to a first aspect of the present invention, there is provided an image processing machine, including: a reader that reads a set of original images from an original composed of a plurality of pages and reads a set of editing images from an original-for-editing for editing the original; a memory that stores the set of original images and the set of editing images read by the reader in units of pages; and a processor that when an editing mode to edit the set of original images based on the set of editing images is set, determines whether or not there are original images that correspond to a first editing image which is a first page of the original-for-editing stored in the memory and a last editing image which is a last page of the original-for-editing stored in the memory, among the set of original images stored in the memory, and edits the set of original images using the set of editing images based on a result of the determination.

According to a second aspect of the present invention, (i) when the processor determines that there are the original images that correspond to the first editing image and the last editing image among the set of original images stored in the memory and (ii) when the number of total pages of the original-for-editing is two, the processor deletes one or more original images between the original image corresponding to the first editing image and the original image corresponding to the last editing image in the set of original images stored in the memory.

According to a third aspect of the present invention, (i) when the processor determines that there are the original images that correspond to the first editing image and the last editing image among the set of original images stored in the memory and (ii) when the number of total pages of the original-for-editing is three or more, the processor replaces one or more original images between the original image corresponding to the first editing image and the original image corresponding to the last editing image in the set of original images stored in the memory, with one or more editing images between the first editing image and the last editing image.

According to a fourth aspect of the present invention, when the processor determines that there is only the original image that corresponds to the first editing image among the set of original images stored in the memory, the processor replaces one or more original images after the original image corresponding to the first editing image in the set of original images stored in the memory, with one or more editing images after the first editing image, and when the processor determines that there is only the original image that corresponds to the last editing image among the set of original images stored in the memory, the processor replaces one or more original images before the original image corresponding to the last editing image in the set of original images stored in the memory, with one or more editing images before the last editing image.

According to a fifth aspect of the present invention, when the processor determines that there is no original images that correspond to the first editing image and the last editing image among the set of original images stored in the memory, the processor adds the set of editing images after the set of original images stored in the memory.

According to the first aspect of the image processing machine in the present invention, when the editing mode to edit a set of original images based on a set of editing images is set, the processor determines whether or not there are an original image corresponding to a first editing image which is a first page of the original-for-editing and an original image corresponding to a last editing image which is a last page of the original-for-editing stored in the memory, among the set of original images stored in the memory, and edits the set of original images using the set of editing images based on the determination result.

That is, by reading an original-for-editing by the reader, it is possible to automatically specify a range of editing and editing contents of the set of original images, thereby automating partial editing of the set of original images using the set of editing images. When having many pages in the set of original images, it is possible for a user to easily edit the set of original images without searching an original image to be edited and specifying or setting a range and editing contents of original images to be edited. Accordingly, this reduces complicated operations by a user, dissolves the inefficiency of rereading the whole of the set of original images, and reduces electric power consumption by the machine.

According to the second aspect of the machine in the present invention, (i) when there are the original images that correspond to the first editing image and the last editing image among the set of original images and (ii) when the number of total pages of the original-for-editing is two, the processor deletes one or more original images between the original image corresponding to the first editing image and the original image corresponding to the last editing image.

It is thus possible to automatically delete original images that are an editing object, when performing partial editing of the set of original images using the set of editing images.

According to the third aspect of the machine in the present invention, (i) when there are the original images that correspond to the first editing image and the last editing image among the set of original images and (ii) when the number of total pages of the original-for-editing is three or more, the processor replaces one or more original images between the original image corresponding to the first editing image and the original image corresponding to the last editing image, with one or more editing images between the first editing image and the last editing image.

It is thus possible to automatically replace original images that are an editing object with the one or more editing images, when performing partial editing of the set of original images using the set of editing images.

According to the fourth aspect of the machine in the present invention, when there is only the original image that corresponds to the first editing image among the set of original images stored in the memory, the processor replaces one or more original images after the original image corresponding to the first editing image, with one or more editing images after the first editing image, and when the processor determines that there is only the original image that corresponds to the last editing image among the set of original images stored in the memory, the processor replaces one or more original images before the original image corresponding to the last editing image, with one or more editing images before the last editing image.

It is thus possible to automatically replace original images that are an editing object with the one or more editing images, when performing partial editing of the set of original images using the set of editing images.

According to the fifth aspect of the machine in the present invention, there is no original images that correspond to the first editing image the last editing image, the processor adds the set of editing images after the set of original images stored in the memory.

It is thus possible to automatically add the set of editing images to original images that are an editing object, when performing partial editing of the set of original images using the set of editing images.

BRIEF DESCRIPTION OF THE DRAWINGS

FIGS. 5A to 5E show examples of partial editing of a set of original images on the printing machine according to the first exemplary embodiment of the present invention.

FIG. 7 is a flowchart, which follows FIG. 6, for explaining control in the original editing mode on the printing machine according to the first exemplary embodiment of the present invention.

FIGS. 8A and 8B show examples of displays on a displaying unit provided on an operating unit of the printing machine according to a second exemplary embodiment of the present invention.

FIGS. 9A to 9E show examples of partial edits of a job original on the printing machine according to the second exemplary embodiment of the present invention.

DESCRIPTION OF THE EMBODIMENTS

Figure 1:
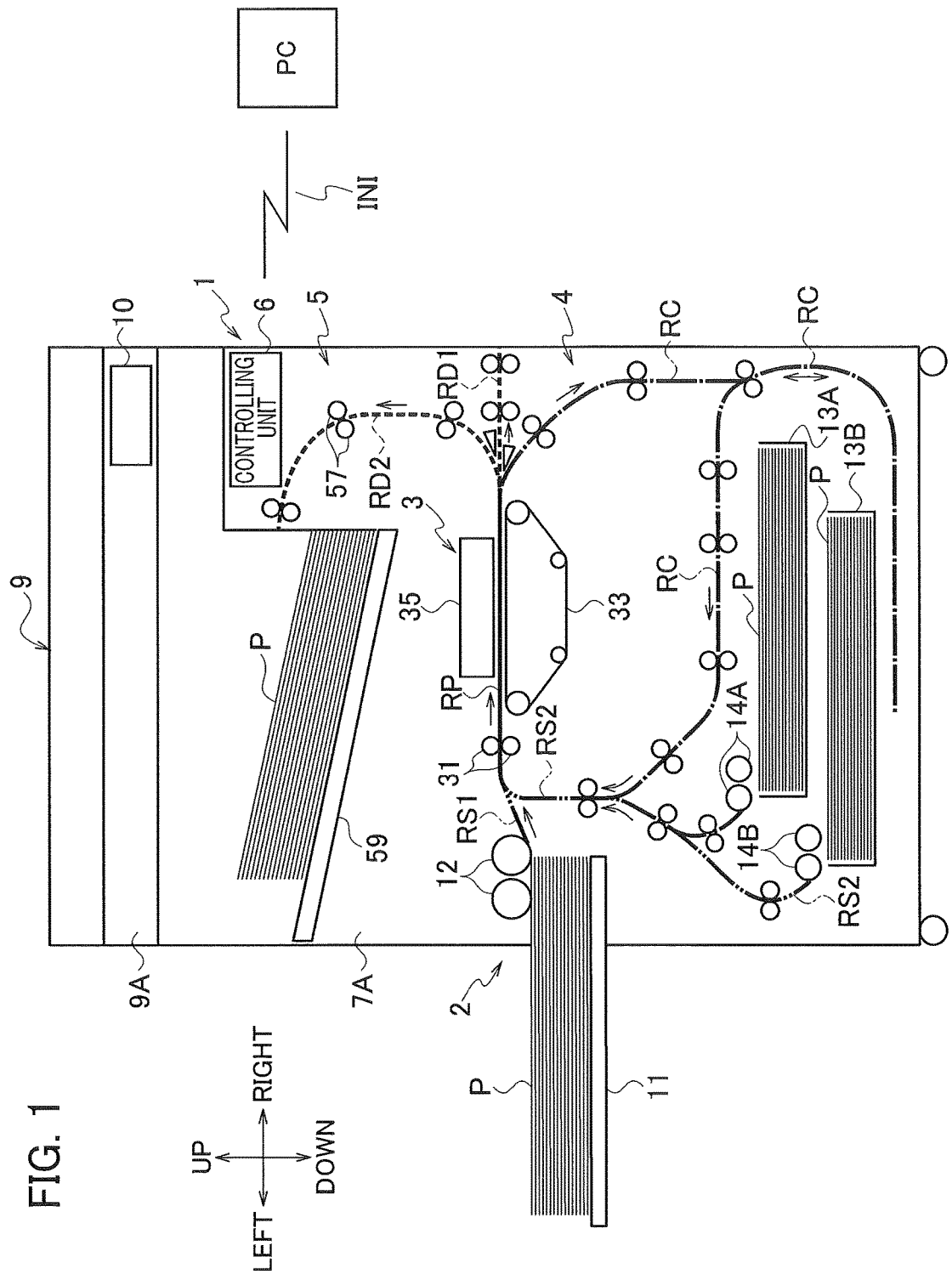
FIG. 1 is a diagram illustrating a schematic configuration of a printing machine to which an image processing machine according to a first exemplary embodiment of the present invention is applied.

Exemplary embodiments of the present invention will be described below with reference to the accompanying drawings. In the drawings, the same or similar reference symbol is attached to the same or similar structural element.

The following exemplary embodiments present examples of an apparatus and the like for realizing the technical concept of the present invention. The technical concept of the present invention regarding the material, the shape, the structure, the arrangement, and the like of various structural components is not limited to these embodiments. Various modifications can be made in the technical concept of the present invention within the scope of claims.

First Embodiment

Figure 2:
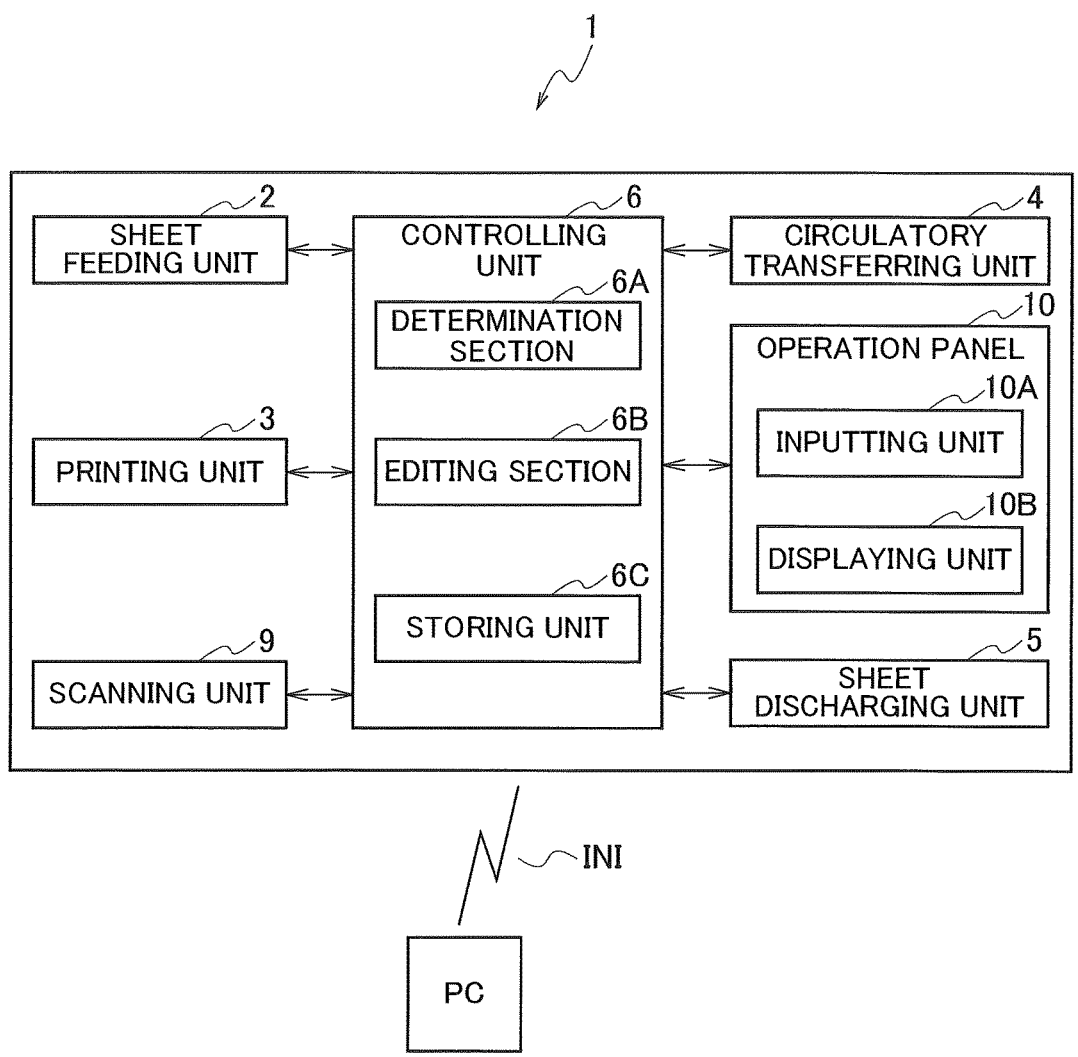
FIG. 2 is a control block diagram of the printing machine according to the first exemplary embodiment of the present invention.

FIG. 1 is a diagram illustrating a schematic configuration of a printing machine 1 according to a first exemplary embodiment of the present invention. FIG. 2 is a control block diagram of the printing machine 1 shown in FIG. 1. In the following description, a direction orthogonal to the sheet surface of FIG. 1 is defined as a front-back direction, and a direction of the front side of the sheet surface is defined as front. Moreover, top and bottom, and right and left in FIG. 1 are defined as a vertical direction, and a right-left direction, respectively.

Here an inkjet (IJ) printer will be described as an example of the printing machine 1, which performs partial editing (original editing) of image data on an original read by a scanning unit. The IJ printer may be configured to print out original images sent by an external machine, such as a PC (personal computer), on printing media.

The image processing machine is applicable to an image forming machine, such as an automatic original reading machine, a copying machine or a facsimile machine including the automatic original reading machine as a scanning part, or a MFP (Multi-Function Peripheral) as a digital multifunctional machine having multiple complex functions.

In the printing machine 1 shown in FIG. 1, transfer routes to transfer a sheet P, which is a printing medium, are shown in bold lines. Among the transfer routes, a route shown in a solid line is a print route RP of a printing unit 3, a route shown in one-dot chain lines is a circulation route RC of a circulatory transferring unit 4, routes shown in dashed lines are a first discharge route RD1 and a second discharge route RD2 of a discharging unit 5, and routes shown in two-dot chain lines are an outer sheet feed route RS1 and an inner sheet feed route RS2. In the following description, an upstream and a downstream mean those in the transfer routes.

As shown in FIGS. 1 and 2, the printing machine 1 includes a sheet feeding unit 2, a printing unit 3, the circulatory transferring unit 4, the sheet discharging unit 5, a controlling unit 6, a casing 7 to accommodate or hold respective parts, and a scanning unit (reader) 9 arranged above a machine body 7A covered by the casing 7.

The sheet feeding unit 2 feeds a not-printed sheet P before printing to the printing unit 3. In duplex printing, the sheet feeding unit 2 refeeds a sheet P, whose front side has been printed, to the printing unit 3. The sheet feeding unit 2 is arranged most upstream in the transfer routes.

An outer sheet feeding base 11 is for stacking sheets P to be used for printing. The outer sheet feeding base 11 is arranged such that a part of the outer sheet feeding base 11 is exposed to the outside.

A pair of outer sheet feeding rollers 12 takes in a sheet P stacked on the outer sheet feeding base 11 one by one, and transfers the sheet P along the outer feed route RS1 toward a pair of resist rollers 31 of the printing unit 3.

Inner sheet feeding bases 13A and 13B are for stacking sheets P to be used for printing. The inner sheet feeding bases 13A and 13B are arranged inside the casing 7.

A pair of inner sheet feeding rollers 14A takes in a sheet P stacked on the inner sheet feeding base 13A one by one, and transfer the sheet P. A pair of inner sheet feeding rollers 14B takes in a sheet P stacked on the inner sheet feeding base 13B one by one, and transfer the sheet P.

The printing unit 3 prints an image on a sheet P, while transferring the sheet P. The printing unit 3 is arranged at a downstream side with respect to the printing unit 2. The printing unit 3 includes the pair of resist rollers 31, a belt transferring unit 33, a belt motor 34, and a head unit 35.

The pair of resist rollers 31 stops a transferred sheet P once to perform a skew correction, and transfers to the belt transferring unit 33. The pair of resist rollers 31 is arranged at an upstream side with respect to the printing unit 3 in the print route RP.

The belt transferring unit 33 transfers the sheet P transferred by the pair of resist rollers 31, while adsorbing and holding the sheet P on the belt. The belt transferring unit 33 is arranged at a downstream side with respect to the pair of resist rollers 31.

The head unit 35 has a plurality of inkjet heads (not shown) in a line type, in each of which a plurality of nozzles is arranged along a direction (front-back direction) orthogonal to a transfer direction of the sheet P. The head unit 35 is arranged above the belt transferring unit 33. The head unit 35 prints an image on the sheet P transferred by the belt transferring unit 33 by discharging ink drops from the nozzles of the inkjet heads.

The circulatory transferring unit 4 transfers a sheet P along the circulation route RC after the front side of the sheet P has been printed, in duplex printing.

The sheet discharging unit 5 discharges a printed sheet P to a discharge tray 59.

It is possible to arrange the scanning unit 9 above the machine body 7A. When the scanning unit 9 is arranged above the machine body 7A, a space with a predetermined height is maintained between the top of the discharge tray 59 and the bottom of a scanner base 9A. Discharged sheets P are stacked on the discharge tray 59 in a piled state within the space.

The scanning unit 9 obtains information for performing printing by the printing unit 3, by optically reading image data on an original. The scanning unit 9 is an automatic original reading machine (detailed description is omitted) with an ADF (Auto Document Feeder) continuously reading an original having many pages, and is independently operable as an image processing machine.

The scanning unit 9 is arranged above the machine body 7A through the scanner base 9A.

An operation panel 10 is arranged on a part corresponding to an upper side of the machine body 7A, for example, a front part of the scanner base 9A. The operation panel 10 includes an inputting unit 10A, such as various operation keys and ten keys, and a displaying unit (display) 10B in a touch panel type. The operation panel 10 is mainly used by a user and is for selecting a job (function) and setting various conditions.

Although detailed description is omitted, through the operation panel 10, guidance of operations is displayed, and setting of a scanning operation or an original editing mode as a job is performed. Moreover, through the operation panel 10, an instruction of start, stop, cancellation, or interruption of an operation, an input of the number of sheets for copying, and a selection of the size of a sheet are performed.

The controlling unit 6 controls operations of each part of the printing machine 1 according to an operation program (control program) corresponding to an operation on the operation panel 10. The controlling unit 6 includes a CPU (processor: illustration omitted), and a storing unit (memory) 6C, such as RAM, ROM, and a hard disk.

The storing unit 6C stores therein various operation programs, processing routines and the like, and temporarily stores therein a prescribed value and a flag corresponding to a job, various conditions based on a user setting, and the like. Moreover, the storing unit 6C stores therein image data (hereinafter called a set of original images) on an original read by the scanning unit 9 in units of pages.

When the original editing mode is set, the storing unit 6C stores therein image data (hereinafter called a set of editing images) of an original-for-editing additionally read in units of pages, and stores therein respective pieces of layout information of the selected set of original images and respective pieces of layout information of the set of editing images.

When the original editing mode is set, the storing unit 6C stores therein the number of total pages of the original-for-editing, a page number of the first page of the original-for-editing, a page number of the last page of the original-for-editing, a page number of an original image whose piece of layout information corresponds to that of an editing image which is the first page of the original-for-editing, and a page number of an original image whose a piece of layout information corresponds to that of an editing image which is the last page of the original-for-editing.

The storing unit 6C may have a storing box function to previously store therein a set of original images and a set of editing images read by the scanning unit 9, a set of original images for example sent from a PC through an internet line INI, and the like in units of originals, as registered originals (hereinafter also called job originals) for a printing job.

When a discharging target of a sheet P printed by the printing unit 3 is a post-processing machine, the printed sheet P is guided to the first discharge route RD1 to be discharged to the post-processing machine, which is not shown.

On the other hand, when a discharging target of a sheet P is the discharge tray 59, the printed sheet P is guided to the second discharge route RD2 to be discharged on the discharge tray 59.

When performing partial editing of a set of original images, the controlling unit 6 reads image data on an original-for-editing by the scanning unit 9, stores additionally read image data as a set of editing images in units of pages in the storing unit 6C, and calculates respective pieces of layout information of pages of the set of original images selected as an editing object and respective pieces of layout information of pages of the set of editing images, and stores them in the storing unit 6C.

When performing partial editing of a set of original images, the controlling unit 6 makes the storing unit 6C store the number of total pages of the set of editing images additionally read.

The controlling unit 6 includes a determination section 6A and an editing section 6B, as its functions.

When performing partial editing of a set of original images, the determination section 6A compares respective pieces of layout information of the set of original images with respective pieces of layout information of an editing image which is the first page of the original-for-editing and an editing image which is the last page of the original-for-editing. The determination section 6A determines whether or not there is an original image whose piece of layout information corresponds to that of the editing image which is the first page of the original-for-editing, and there is an original image whose piece of layout information corresponds to that of the editing image which is the last page of the original-for-editing, among the set of original images.

On the basis of a result of the determination by the determination section 6A, the editing section 6B edits the set of original images using the set of editing images.

Figure 3A:
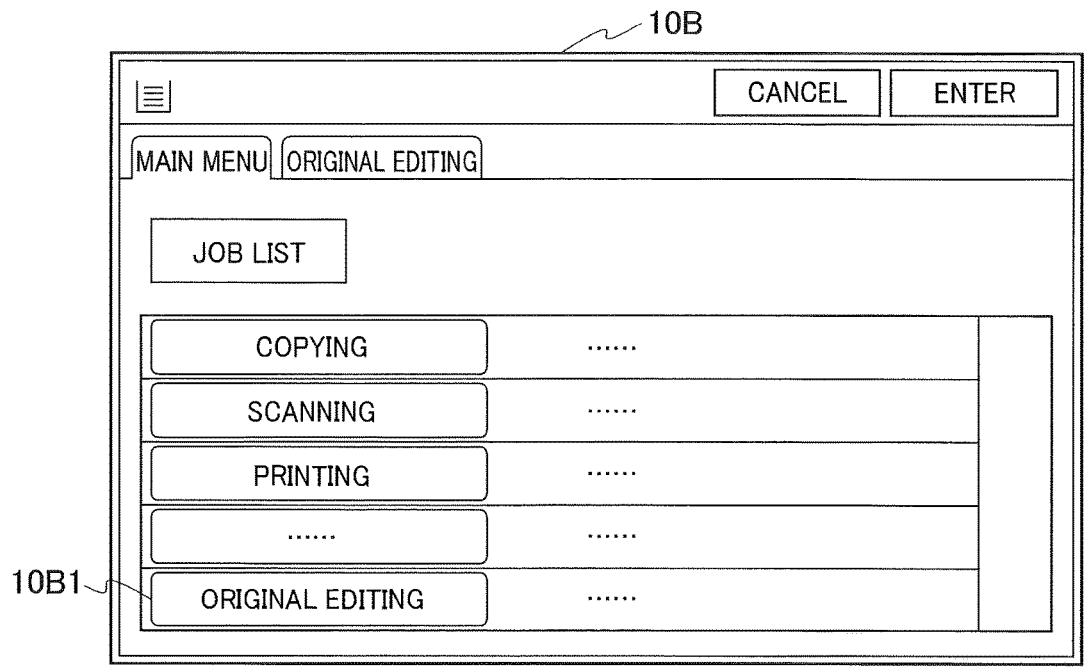
FIGS. 3A and 3B show examples of displays on a displaying unit provided on an operating unit of the printing machine according to the first exemplary embodiment of the present invention.
Figure 3B:
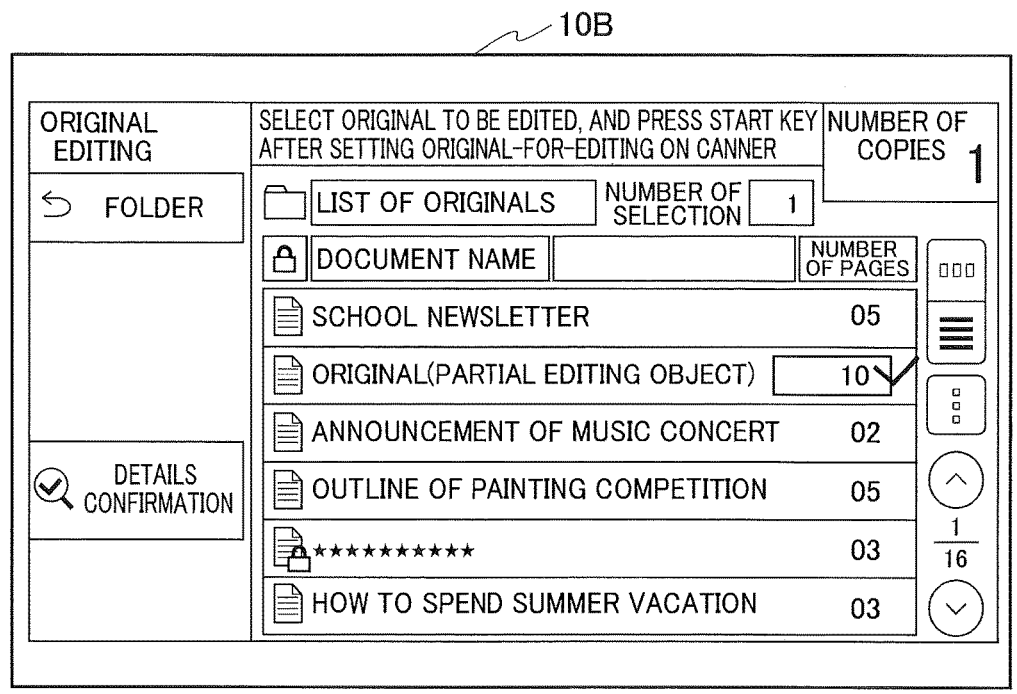

FIGS. 3A and 3B show examples of displays on the displaying unit 10B of the operation panel 10 of the printing machine 1 shown in FIGS. 1 and 2. FIG. 3A shows a main menu screen, and FIG. 3B shows a screen for the original editing mode.

That is, the displaying unit 10B of the operation panel 10 displays a selection button 10B1 for the original editing mode as one of jobs, in addition to a copying operation, a scanning operation, and a printing operation, for example as shown in FIG. 3A.

In a case where the main menu screen is displayed, when a user performs a press operation of the selection button 10B1 for the original editing mode, for example as shown in FIG. 3B, a display of the displaying unit 10B is changed to a screen for the original editing mode.

On the screen for the original editing mode, in addition to a list of originals (document names) stored in the storing unit 6C, a guidance such as "select an original to be edited, and press the start key after setting an original-for-editing on the scanner" is displayed.

Figure 4B:
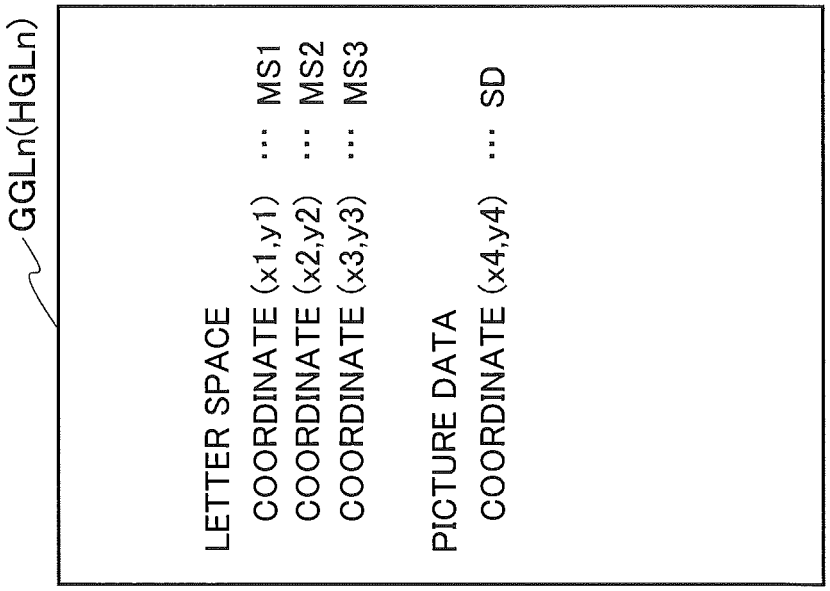
FIGS. 4A and 4B respectively show an example of an original image and an example of a piece of layout information calculated from the original image on the printing machine according to the first exemplary embodiment of the present invention.
Figure 4A:
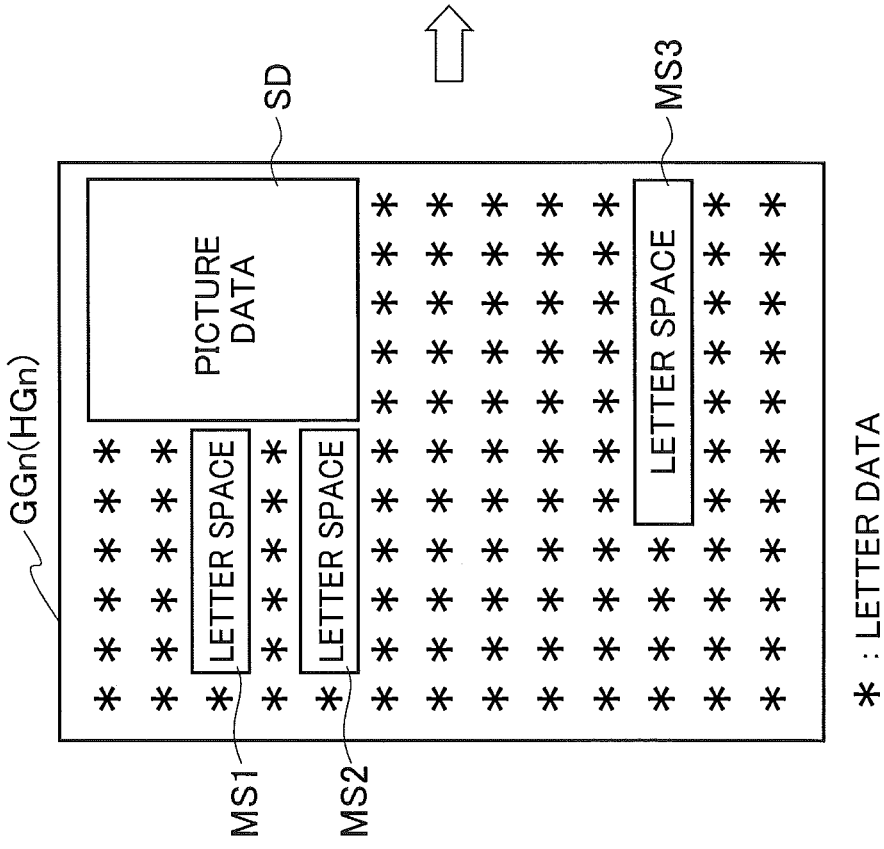

FIG. 4A shows an example of an original image GGn scanned by the printing machine 1 according to the first exemplary embodiment. FIG. 4B shows an example of a piece of layout information GGLn calculated from the original image GGn.

The original image GGn is stored in the storing unit 6C in units of pages. For example, as shown in FIG. 4A, image data within a valid reading area on the original is configured by letter data shown as "*" in the figure, letter spaces MS1, MS2 and MS3 corresponding to blanks of letter data, and picture data SD.

The piece of layout information GGLn calculated from the original image GGn, for example, as shown in FIG. 4B, is configured by coordinates data (x1, y1), (x2, y2), and (x3, y3) at the upper lefts of the letter spaces MS1, MS2, and MS3, and coordinates data (x4, y4) at the upper left of the picture data SD. The piece of layout information GGLn is associated to the original image GGn and stored in the storing unit 6C.

Although detailed description is omitted, it is same for an editing image (HGn) and a piece of layout information (HGLn) calculated from the editing image (HGn) to be stored in the storing unit 6C.

In a case of editing a set of original images, a method to automatically determine a range of editing (editing part) using pieces of layout information as shown in FIG. 4B will be described below.

FIGS. 5A to 5E respectively show examples of an original-for-editing, which is to be used for partial editing of the set of original images, with a range of editing and editing contents.

FIG. 5A is an example of adding new editing images "A" and "B" for 2 pages after an original image "10" on the last page (the end) of an original composed of 10 pages. In this case, as an original-for-editing, the scanning unit 9 is made additionally read the editing images "A" and "B" for 2 pages to be added.

In the original editing mode, the determination section 6A compares respective pieces of layout information of the set of original images "1" to "10" with respective pieces of layout information of the set of editing images "A" and "B". When finding no image ("A" and "B") having the same piece of layout information as those of the editing images "A" and "B" among the set of original images, the determination section 6A determines that the partial editing is editing to add pages ("A" and "B") at the end of the set of original images.

FIG. 5B is an example of replacing original images "6", "7", "8", "9", and "10" for 5 pages, which are page 6 and subsequent pages of the original composed of 10 pages, with editing images "A", "B", "C", "D", and "E" for 5 pages. In this case as an original-for-editing, the scanning unit 9 is made additionally read an editing image "5", which is the same as an original image which is page 5 of the original, and the editing images "A", "B", "C", "D", and "E" for 5 pages for replacing.

In the original editing mode, the determination section 6A compares respective pieces of layout information of the set of original images in the original composed of 10 pages with those of an editing image (first editing image) which is the first page of the original-for-editing and an editing image (last editing image) which is the last page of the original-for-editing. When finding a fact that the original includes an original image ("5") having the same piece of layout information as that of the first editing image among the set of original images, the determination section 6A determines that the partial editing is editing to replace original images after the original image corresponding to the first editing image among the set of original images, with editing images after the first editing image.

FIG. 5C is an example of replacing original images "3", "4", and "5" for 3 pages, which are pages 3 to 5 of the original composed of 10 pages, with editing images "A" and "B" for 2 pages. In this case, as an original-for-editing, the scanning unit 9 is made additionally read an editing image "2", which is the same as the original image which is page 2 of the original, editing images "A" and "B" for 2 pages for replacing, and an editing image "6", which is the same as the original image which is page 6 of the original.

In the original editing mode, the determination section 6A compares respective pieces of layout information of the set of original images in the original composed of 10 pages with those of the editing image (first editing image) which is the first page of the original-for-editing and an editing image (last editing image) which is the last page of the original-for-editing. When finding a fact that (i) the original includes original images ("2", and "6") having the same pieces of layout information as those of the first editing image and the last editing image among the set of original images, and (ii) the number of total pages of the set of editing images is two or more, the determination section 6A determines that the partial editing is editing to replace original images between the original image corresponding to the first editing image and the original image corresponding to the last editing image among the set of original images, with editing images between the first editing image and the last editing image.

FIG. 5D is an example of deleting original images "3", "4", and "5" for 3 pages, which are pages 3 to 5 of the original composed of 10 pages. In this case, as an original-for-editing, the scanning unit 9 is made additionally read an editing image "2", which is the same as the original image which is page 2 of the original, and an editing image "6", which is the same as the original image which is page 6 of the original.

In the original editing mode, the determination section 6A compares respective pieces of layout information of the set of original images in the original composed of 10 pages with those of an editing image (first editing image) which is the first page of the original-for-editing and an editing image (last editing image) which is the last page of the original-for-editing. When finding a fact that (i) the original includes original images ("2", "6") having the same pieces of layout information as those of the first editing image and the last editing image among the set of original images, and (ii) the number of total pages of the original—for editing is two, the determination section 6A determines that the partial editing is editing to delete original images between the original image corresponding to the first editing image and the original image corresponding to the last editing image in the set of original images.

FIG. 5E is an example of replacing original images "1", "2", "3", "4", and 5" for 5 pages, which are page 5 and preceding pages of the original composed of 10 pages, with editing images "A", "B", "C", "D", and "E" for 5 pages. In this case, as an original-for-editing, the scanning unit 9 is made additionally read editing images "A", "B", "C", "D" and "E" for 5 pages for replacing, and an editing image "6", which is the same as the original image which is page 6 of the original.

In the original editing mode, the determination section 6A compares respective pieces of layout information of the set of original images in the original composed of 10 pages with those of the editing image (first editing image) which is the first page of the original-for-editing and the editing image (last editing image) which is the last page of the original-for-editing. When fining a fact that the original includes an original image ("6") having the same piece of layout information as that of the last editing image among the set of original images, the determination section 6A determines that the partial editing is editing to replace original images before the original image corresponding to the last editing image in the set of original images, with editing images before the last editing image.

As described above, in the original editing mode, reading of editing images and additional reading of original images before and after the editing images as necessary automatically identify a range of editing and editing contents in the set of original images, such as an addition, a deletion, and a replacement. This reduces works and time required for searching an original image to be edited by the user and for specifying editing contents in units of images.

Next, operations in the original editing mode by the printing machine 1 having the above-described configuration will be described.

Figure 6:
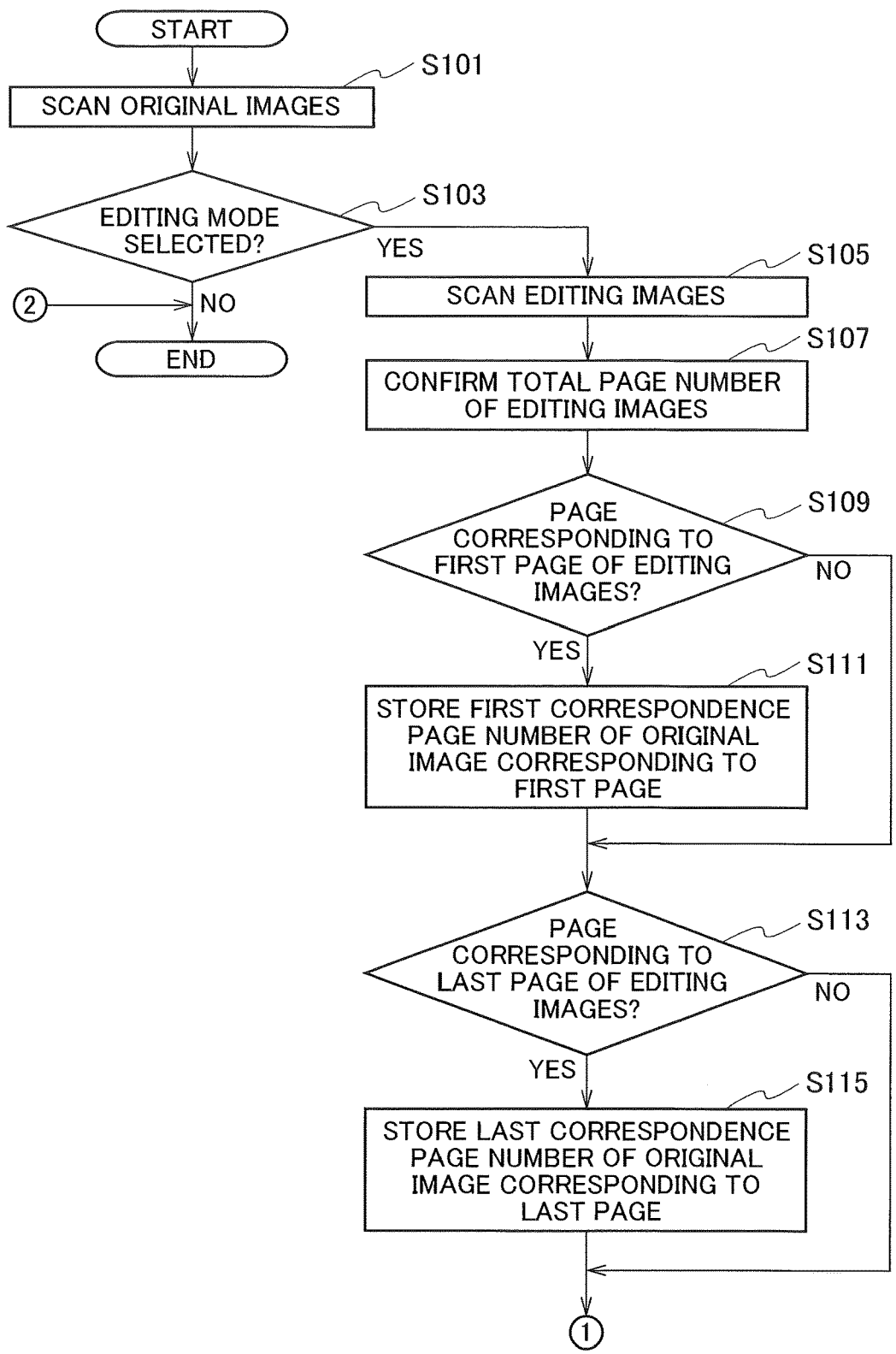
FIG. 6 is a flowchart for explaining control in an original editing mode on the printing machine according to the first exemplary embodiment of the present invention.

FIGS. 6 and 7 are flowcharts of a process in the original editing mode. The original editing mode is previously set on the main menu screen as a job. A case of reading a new original having plural pages and of partially editing a part of read original images will be described as an example.

That is, when the main menu screen, for example, as shown in FIG. 3A, is displayed on the displaying unit 10B of the operation panel 10, it is assumed that a user selects a scanning operation of an original. When a press operation of a start key is performed through the inputting unit 10A of the operation panel 10 after the user sets the original on the scanning unit 9, the controlling unit 6 controls the scanning unit 9 to make the scanning unit 9 read a set of original images, and makes the storing unit 6C store the set of original images read by the scanning unit 9 therein in units of pages, for example (step S101). At this time the controlling unit 6 updates a list of document names in accordance with the set of original images stored in the storing unit 6C.

The document name of the set of original images may be registered by a user at the end of storing the set of original images in the storing unit 6C, or may be automatically registered on the basis of the date and time data, and the like. Moreover, storing of the set of original images is not limited to units of pages. The set of original images for plural pages may be stored as a unit of one document until the original editing mode is selected.

When the original editing mode is not selected by the user on the main menu screen (step S103; NO), the scanning operation of the original images ends.

On the other hand, with the main menu screen displayed on the displaying unit 10B, when the original editing mode is selected on the main menu screen through a user operation (step S103; YES), the controlling unit 6 displays a screen for the original editing mode, for example, as shown in FIG. 3B, on the displaying unit 10B.

When a press operation of the start key is performed through the inputting unit 10A after an original-for-editing is set on the scanning unit 9 by the user, the controlling unit 6 controls the scanning unit 9 to make the scanning unit 9 read a set of editing images, and makes the storing unit 6C store the set of editing images read by the scanning unit 9 therein in units of pages (step S105).

Then the controlling unit 6 confirms the number of total pages of the original-for-editing, and makes the storing unit 6C store the number therein (step S107).

The determination section 6A of the controlling unit 6 calculates respective pieces of layout information of the set of original images, which is selected as an editing object by the user, in units of pages, and calculates respective pieces of layout information of the set of editing images in units of pages. Subsequently, the determination section 6A determines whether or not there is an original image whose piece of layout information corresponds to that of an editing image (first editing image) which is the first page of the original-for-editing (step S109).

When the determination section 6A determines that there is an original image whose piece of layout information corresponds to that of the first editing image (step S109; YES), the controlling unit 6 makes the storing unit 6C store a page number of the original image in the original (first correspondence page number) therein (step S111).

On the other hand, when the determination section 6A determines that there is no original image whose piece of layout information corresponds to that of the first editing image (step S109; NO), the first correspondence page number remains zero and the processing goes to step S113.

At step S113, the determination section 6A determines whether or not there is an original image whose piece of layout information corresponds to that of the editing image (last editing image) which is the last page of the original-for-editing (step S113).

When the determination section 6A determines that there is an original image whose piece of layout information corresponds to that of the last editing image (step S113; YES), the controlling unit 6 makes the storing unit 6C store a page number of the original image in the original (last correspondence page number) therein (step S115).

On the other hand, when the determination section 6A determines that there is no original image whose piece of layout information corresponds to that of the last editing image (step S113; NO), the last correspondence page number remains zero and the processing goes to step S117.

Next, the determination section 6A determines whether or not the first correspondence page number stored in the storing unit 6C is equal to or more than one (the first correspondence page number ≥1) (step S117).

When determining that the first correspondence page number is equal to or more than one (step S117; YES), the determination section 6A determines whether or not the last correspondence page number stored in the storing unit 6C is more than the first correspondence page number (last correspondence page number>first correspondence page number) (step S119).

When the last correspondence page number is equal to or less than the first correspondence page number (step S119; NO), the determination section 6A determines that the partial editing is, as shown in FIG. 5B, editing to replace original images after the original image corresponding to the editing image (first editing image) which is the first page of the original-for-editing in the set of original images, with editing images after the first editing image. That is, when there is only an original image in the set of original images, whose piece of layout information is the same as that of the first editing image, the editing section 6B replaces original images after the original image corresponding to the first editing image with editing images after the first editing image, and updates the set of original images stored in the storing unit 6C (step S121).

After the partial editing (replacement) for the set of original images is performed as described above, the original editing mode ends.

On the other hand, when the last correspondence page number is more than the first correspondence page (step S119; YES), the determination section 6A reads out the number of total pages of the original-for-editing and determines whether or not the number of total pages is two (step S123).

When the number of total pages of the original—for editing is not two (step 123; NO), the determination section 6A determines that the partial editing is, as shown in FIG. 5C, editing to replace original images in the set of original images between an original image corresponding to an editing image (first editing image) which is the first page of the original-for-editing and an original image corresponding to an editing image (last editing image) which is the last page of the original-for-editing, with editing images between the first editing image and the last editing image. That is, when (i) there are an original image whose piece of layout information corresponds to that of the first editing image and an original image whose piece of layout information corresponds to that of the last editing image among the set of original images, and (ii) the number of pages of the original-for-editing is three or more, the editing section 6B replaces original images from an original image after an original image corresponding to the first editing image to an original image before an original image corresponding to the last editing image, with editing images from an editing image after the first editing image to an editing image before the last editing image, and updates the set of original images stored in the storing unit 6C (step S125).

After the partial editing (replacement) for the set of original images is performed as described above, the original editing mode ends.

When the number of total pages of the original-for-editing is two (step S123; YES), the determination section 6A determines that the partial editing is, as shown in FIG. 5D, editing to delete original images between an original image corresponding to an editing image (first editing image) which is the first page of the original-for-editing and an original image corresponding to an editing image (last editing image) which is the last page of the original-for-editing in the set of original images. That is, when (i) there are an original image whose piece of layout information is the same as that of the first editing image and an original image whose piece of layout information is the same as that of the last editing image in the set of original images, and (ii) the set of editing images is of two pages that are the first page and the last page, the editing section 6B deletes original images from an original image after the original image corresponding to the first editing image to an original image before an original image corresponding to the last editing image, and updates the set of original images stored in the storing unit 6C (step S127).

After the partial editing (deletion) for the set of original images is performed as described above, the original editing mode ends.

On the other hand, when the first correspondence page number is not equal to or more than one (step S117; NO), the controlling unit 6 determines whether or not the last correspondence page number stored in the storing unit 6C is equal to or more than one (last correspondence page number ≥1) (step S129).

When the last correspondence page number is not equal to or more than one (step S129; NO), the determination section 6A determines that the partial editing is, as shown in FIG. 5A, an addition of pages at the end of the set of original images. That is, when there is no original image in the set of original images that has the same piece of layout information as those of the editing image (first editing image) which is the first page of the original-for-editing and the editing image (last editing image) which is the last page of the original-for-editing, the editing section 6B adds the set of editing images at the end of the set of original images, and updates the set of original images stored in the storing unit 6 (step S131).

After the partial editing (addition) for the set of original images is performed as described above, the original editing mode ends.

When the last correspondence page number is equal to or more than one (step S129; YES), the determination section 6A determines that the partial editing is, as shown in FIG. 5E, editing to replace original images before an original image corresponding to an editing image (last editing image) which is the last page of the original-for-editing, with editing images before the last editing image. That is, when there is only an image whose piece of layout information is the same as that of the last editing image in the set of original images, the editing section 6B replaces original images before the original image corresponding to the last editing image with editing images before the last editing image, and updates the set of original images stored in the storing unit 6C (step S133).

After the partial editing (replacement) for the set of original images is performed as described above, the original editing mode ends.

As describe above, the printing machine 1, to which an image processing machine according to the first exemplary embodiment is applied, reduces user's complicated operations to the most and achieves electric power saving when editing a part of the set of original images in units of pages. That is, by only reading an original-for-editing, the range of editing and the editing contents are automatically specified. In particular, when performing partial editing for the set of original images for many pages, it is possible to reduce works and time required for partial editing for the set of original images to improve efficiency. Moreover, when performing partial editing for the set of original images, there is no need of rereading the whole of the original having plural pages, thereby reducing the electricity consumption, which is economical.

According to the above-described first exemplary embodiment, the partial editing for a set of original images is described as an operation after reading the set of original images as an example. It is however not limited to this case, and will be applied in the same way to a case where the partial editing is performed for a set of original images that have been previously registered.

Second Exemplary Embodiment

As a second exemplary embodiment of the present invention, there will be described with the printing machine 1 shown in FIGS. 1 and 2, as an example, a case of using a plurality of job originals previously stored in the storing unit 6C, editing a part of a job original before editing, which is an editing object, on the basis of a job original-for-editing, and printing out a job original after editing.

In the second exemplary embodiment, as partial editing (original editing mode), it is possible to perform processing of adding a job original-for-editing, which is not in a job original before editing, to the job original before editing, processing of replacing a part of a job original before editing with a job original-for-editing, which is not in the job original before editing, and processing of deleting a part of a job original before editing.

In the printing machine 1 according to the second exemplary embodiment, when performing partial editing of a job original, the determination section 6A of the controlling unit 6 determines whether or not editing contents selected by a user are set, which include a job original before editing, a job original-for-editing, the number of a page immediately before editing in the job original before editing, the number of a page immediately after editing in the job original before editing, and the like.

When the determination section 6A determines that editing contents are set, the editing section 6B edits a part of the job original before editing on the basis of the editing contents.

The controlling unit 6 controls each unit of the printing machine 1 on the basis of the editing contents (job original after editing), and performs a printing operation to obtain a printout corresponding to the job original after editing.

As the editing section 6B, an editing operation may be performed using a set of original images to be used for an actual printing operation. Moreover, an editing operation may be virtually performed on a screen for a preview display on the displaying unit 10B, which will be described later, to perform a printing operation using a function such as interrupt processing (interrupt job).

FIGS. 8A and 8B are examples of displays on the displaying unit 10B on the operation panel (setting section) of the printing machine 1 when performing partial editing using a plurality of job originals previously stored in the storing unit 6C. FIG. 8A shows a screen for the original editing mode, which follows the main menu screen (refer to FIG. 3A, for example). FIG. 8B shows a display screen (preview display) of editing contents.

That is, with the main menu screen displayed on the displaying unit 10B of the operation panel 10, when a press operation of the selection button 10B1 for the original editing mode is performed by the user, a display on the displaying unit 10B is changed to the screen for the original editing mode as shown in FIG. 8A, for example.

On the screen for the original editing mode, a guidance, such as "select an original to be edited and an original-for-editing", is displayed with a list of originals (document names) stored in the storing unit 6C and the like.

Moreover, on the screen for the original editing mode, in addition to the list of originals, a selection button 10B2 for "empty job" is displayed in a list form. A press operation of the selection button 10B2 is performed instead of that of an original-for-editing, for example. "Empty job" is selected when processing to delete a part of a job original before editing, which is an editing object, is performed in the original editing mode.

With the screen for the original editing mode displayed, when the user performs a press operation of a confirmation button, the display on the displaying unit 10B is changed to a display screen for editing contents as shown in FIG. 8B for example.

As a display screen for the editing contents, page numbers of original images of a job original before editing, and page numbers of editing images of a job original-for-editing (when an original-for-editing is selected) are displayed in preview. Moreover, page numbers of original images of a job original after editing are displayed in preview. When an original-for-editing is not selected (when a press operation of non-selection button 10B4, which will be described later, is performed), a column for a job original-for-editing is empty.

On the display screen for the editing contents, page selection buttons 10B3 and the non-selection button 10B4 are displayed. The non-selection button 10B4 is a button for which a press operation is performed when pages are not specified. In accordance with press operations of the page selection buttons 10B3, the number of a page immediately before editing and the number of a page immediately after editing in the job original before editing are displayed. When a press operation of the non-selection button 10B4 is performed, a symbol "x" which represents non-selection, is displayed.

FIGS. 9A to 9E respectively show examples of partial editing of an original, which is an editing object, with editing contents and printouts.

FIG. 9A is an example of adding a job original-for-editing to a part of a job original before editing.

In the original editing mode, it is assumed that a user selects, for example, a job original before editing composed of 10 pages, a job original-for-editing composed of "A" and "B", and the number of a page immediately before editing "10" and the number of a page immediately after editing "x (non-selection)" as editing contents.

The determination section 6A then determines that the editing contents are for processing of adding a job original-for-editing after an original image which is the last page "10" (the end), as the number of a page immediately before editing is "10" and the number of a page immediately after editing is "x".

On the basis of this determination result (editing contents), the editing section 6B adds the job original-for-editing composed of "A" and "B" for 2 pages after the original image which is page 10.

In this case, the controlling unit 6 controls each unit in accordance with the job original after editing, performs a printing operation on the basis of the original images which are pages 1 to 10, and subsequently performs a printing operation on the basis of the job original-for-editing composed of "A" and "B". As a job original after partial-editing, a printout of the job original composed of 10 pages and the job original-for-editing composed of 2 pages added after the job original is obtained.

FIG. 9B is an example of replacing a part of a job original before editing by a job original-for-editing.

In the original editing mode, it is assumed that a user selects, for example, a job original before editing composed of 10 pages, a job original-for-editing composed of "A" and "B", the number of a page immediately before editing "5", and the number of a page immediately after editing "x (non-selection)" as editing contents.

The determination section 6A then determines that the editing contents are for processing of replacing original images "6" to "10" which are pages 6 to 10 of the job original before editing, with the job original-for-editing, as the number of a page immediately before editing is "5" and the number of a page immediately after editing is "x".

On the basis of this determination result (editing contents), the editing section 6B replaces original images which are pages 6 to 10 of the job original before editing, with the job original-for-editing composed of "A" and "B" for 2 pages.

In this case, the controlling unit 6 controls each unit in accordance with the job original after editing, performs a printing operation on the basis of original images which are pages 1 to 5, cancels the printing operation on the basis of original images which are the following pages of the job original before editing, and subsequently performs a printing operation on the basis of the job original-for-editing composed of "A" and "B". As a job original after editing, a printout in which a latter half (5 pages) of the job original composed of 10 pages is replaced by the job original-for-editing composed of "A" and "B" for 2 pages, is obtained.

FIG. 9C is another example of replacing a part of a job original before editing by a job original-for-editing.

In the original editing mode, it is assumed that a user selects, for example, a job original before editing composed of 10 pages, a job original-for-editing composed of "A" and "B", the number of a page immediately before editing "3", and the number of a page immediately after editing "7" as editing contents.

The determination section 6A then determines that the editing contents are for processing of replacing original images "4", "5", and "6" which are pages 4 to 6 of the job original before editing with the job original-for-editing, as the number of a page immediately before editing is "3" and the number of a page immediately after editing is "6".

On the basis of this determination result (editing contents), the editing section 6B replaces original images which are pages 4 to 6 of the job original before editing, with the job original-for-editing composed of "A" and "B" for 2 pages.

In this case, the controlling unit 6 controls each unit in accordance with the job original after editing, and performs a printing operation on the basis of the job original-for-editing composed of "A" and "B", for example, as interrupt processing, when performing a printing operation on the basis of the original images which are pages 4 to 6. As a result, as a job original after editing, a printout in which pages 4 to 6 of the job original composed of 10 pages are replaced with the job original-for-editing composed of "A" and "B" for 2 pages, is obtained.

FIG. 9D is an example of deleting a part of a job original before editing in accordance with an operation of the selection button 10B2 for "empty job".

In the original editing mode, it is assumed that a user selects, for example, a job original before editing composed of 10 pages, "empty job" as a job original-for-editing, the number of a page immediately before editing "3", and the number of a page immediately after editing "7", as editing contents.

The determination section 6A then determines that the editing contents are for processing of deleting original images which are pages 4 to 6 of the job original before editing, as the number of a page immediately before editing is "3", the number of a page immediately after editing is "7", and the job original-for-editing is "empty job".

On the basis of this determination result (editing contents), the editing section 6B deletes the original images which are pages 4 to 6 of the job original before editing.

In this case, the controlling unit 6 controls each unit in accordance with the job original after editing. When the controlling unit 6 performs a printing operation on the basis of the original images which are pages 4 to 6, the controlling unit 6 cancels the printing operation, for example. As a result, as a job original after editing, a printout in which pages 4 to 6 of the job original composed of 10 pages are deleted, is obtained.

FIG. 9E is another example of replacing a part of a job original before editing by a job original-for-editing.

In the original editing mode, it is assumed that a user selects, for example, a job original before editing composed of 10 pages, a job original-for-editing composed of "A" and "B", the number of a page immediately before editing "x (non-selection)", and the number of a page immediately after editing "4" as editing contents.

The determination section 6A then determines that the editing contents are for processing of replacing original images "1", "2", and "3" which are pages 1 to 3 of the job original before editing, with the job original-for-editing, as the number of a page immediately before editing is "x" and the number of a page immediately after editing is "4".

On the basis of this determination result (editing contents), the editing section 6B replaces the original images which are pages 1 to 3 of the job original before editing, with the job original-for-editing composed of "A" and "B" for 2 pages.

In this case, when the controlling unit 6 controls each unit on the basis of the job original after editing, the controlling unit 6 first performs a printing operation on the basis of the job original-for-editing composed of "A" and "B" by interrupt processing. The controlling unit 6 then cancels a printing operation on the basis of the original images which are pages 1 to 3 of the job original before editing, and subsequently performs a printing operation on the basis of original images which are page 4 and subsequent pages. As a job original after editing, a printout in which pages 1 to 3 of the job original composed of 10 pages are replaces with the job original-for-editing composed of "A" and "B" for 2 pages, is obtained.

As described above, in the original editing mode, using a plurality of job originals previously stored in the storing unit 6C and controlling printing operations in accordance with a user setting (editing contents), make partial editing easy, such as a new addition, a deletion, and a replacement of a part of a job original.

Next, operations in the original editing mode on the printing machine 1 having the above-described configuration will be described.

Figure 10:
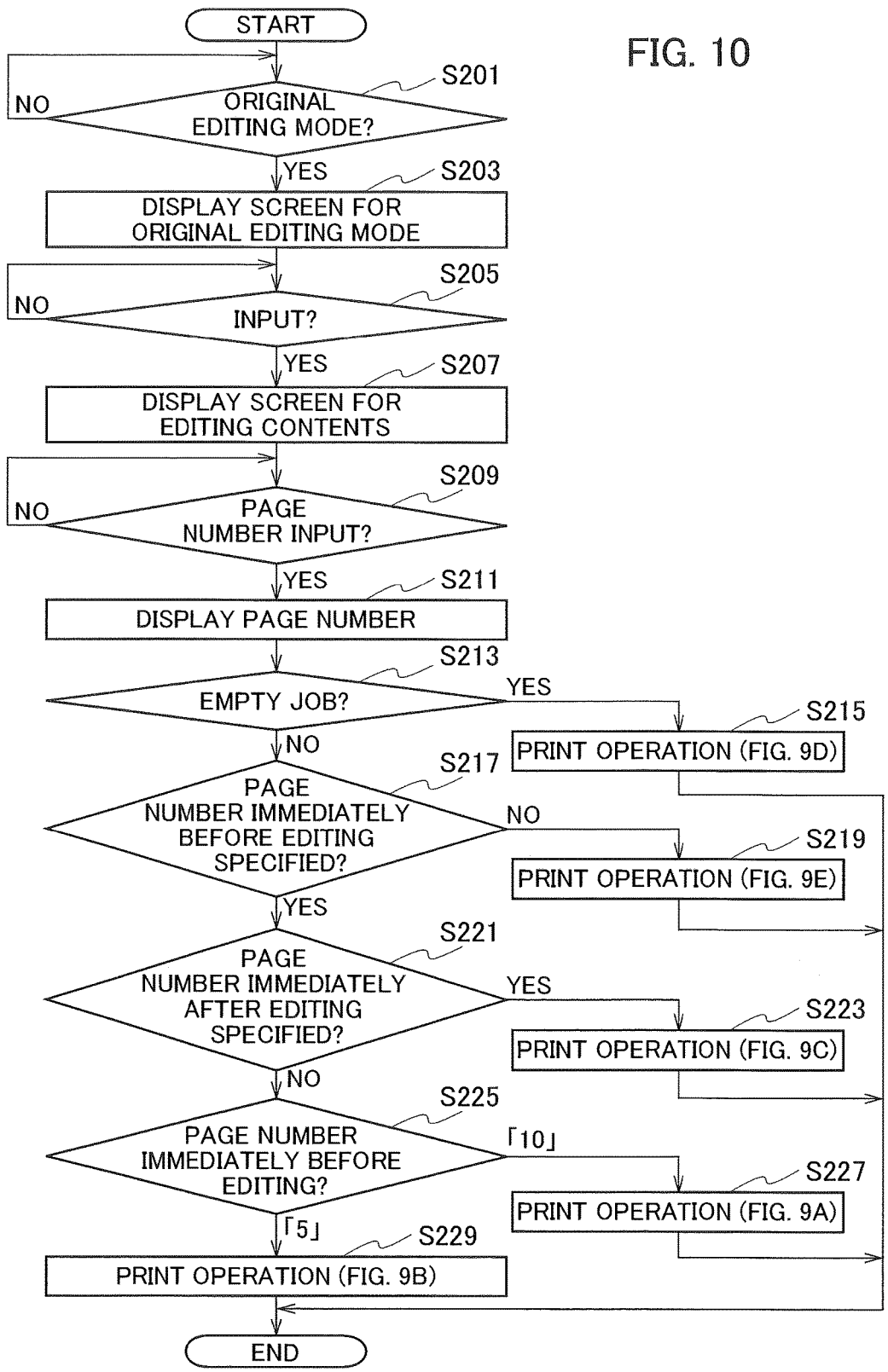
FIG. 10 is a flowchart for explaining control in the original editing mode on the printing machine according to the second exemplary embodiment of the present invention.

FIG. 10 is a flowchart of processing in the original editing mode. With reference to FIGS. 9A to 9E as examples, there will be described a case of making use of a plurality of job originals previously stored in the storing unit 6C and performing a printout by newly adding, deleting, or replacing a part of a job original before editing.

That is, when the main menu screen, for example, as shown in FIG. 3A, is displayed on the displaying unit 10B of the operation panel 10, it is assumed that the original editing mode is selected by a press operation of the selection button 10B1 by a user before a printing operation of performing a printout of original images previously stored in the storing unit 6C (step S201; YES). The controlling unit 6 then switches the display on the displaying unit 10B to the screen for the original editing mode shown in FIG. 8A (step S203).

Moreover, with the screen for the original editing mode displayed, when a job original before editing, which is to be an object of editing, and a job original-for-editing or "empty job" (10B2) are input by a selection operation by a user, for example (step S205; YES), the controlling unit 6 switches the display on the displaying unit 10B to the display screen for editing contents shown in FIG. 8B. Then the controlling unit 6 displays the input job original before editing, and the input job original-for-editing or "empty job" in preview on the screen, and encourages the user of inputting the number of a page immediately before editing and the number of a page immediately after editing (step S207).

With the screen for editing contents displayed, it is assumed that the number of a page immediately before editing, and the number of a page immediately after editing are input by a selection operation by the user (step S209; YES). The controlling unit 6 then displays the number of a page immediately before editing, and the number of a page immediately after editing on the screen of the displaying unit 10B (step S211).

Then the determination section 6A of the controlling unit 6 determines whether or not editing contents are set. When the determination section 6A determines that editing contents are set, the controlling unit 6 makes the editing section 6B perform editing of a job original before editing on the basis of the editing contents, and controls the printing unit 3 and the like to obtain a printout corresponding to the job original after editing.

That is, the determination section 6A of the controlling unit 6 determines whether or not the job original-for-editing is "empty job", for example (step S213). When the job original-for-editing is "empty job" (step S213; YES), for example, as shown in FIG. 9D, as the number of a page immediately before editing is "3" and the number of a page immediately after editing is "7", the controlling unit 6 determines that the editing contents are for processing of deleting original images which are pages 4 to 6 of the job original before editing composed of 10 pages.

On the basis of this determination result (editing contents), the editing section 6B of the controlling unit 6 deletes the original images which are pages 4 to 6 of the job original before editing, and the printing machine 1 prints out original images which are pages 1, 2, 3, 7, 8, 9, and 10 as a job original after editing (step S215).

As described above, after the original images partially edited (deleted) are printed out, the original editing mode ends.

When the determination section 6A of the controlling unit 6 determines that the job original-for-editing is not "empty job" (step S213; NO), the determination section 6A determines, for example, whether or not the number of a page immediately before editing is specified (step S217). When the page immediately before editing is not specified (step S217; NO), for example, as shown in FIG. 9E, as the job original-for-editing is composed of "A" and "B", and the number of a page immediately after editing is "4", the determination section 6A determines that the editing contents are for processing of replacing the original images which are pages 1 to 3 of the job original before editing composed of 10 pages, with the job original—for editing.

On the basis of this determination result (editing contents), the editing section 6B of the controlling unit 6 replaces the original images which are pages 1 to 3 of the job original before editing, with the job original-for-editing composed of "A" and "B". Accordingly, the printing machine 1 prints out original images which are pages A, B, 4, 5, 6, 7, 8, 9, and 10 as a job original after editing (step S219).

As described above, after the original images partially edited (replaced) are printed out, the original editing mode ends.

When the determination section 6A of the controlling unit 6 determines that the number of a page immediately before editing is specified (step S217; YES), the determination section 6A determines, for example, whether or not the number of a page immediately after editing is specified (step S221). When the number of a page immediately after editing is specified (step S221; YES), for example, as shown in FIG. 9C, as the job original-for-editing is composed of "A" and "B", the number of a page immediately before editing is "3", and the number of a page immediately after editing is "7", the determination section 6A determines that the editing contents are for processing of replacing the original images which are pages 4 to 6 of the job original before editing composed of 10 pages with the job original-for-editing.

On the basis of this determination result (editing contents), the editing section 6B of the controlling unit 6 replaces the original images which are pages 4 to 6 of the job original before editing, with the job original-for-editing composed of "A" and "B". Accordingly, the printing machine 1 prints out original images which are pages 1, 2, 3, A, B, 7, 8, 9, and 10 as a job original after editing (step S223).

As described above, after the original images partially edited (replaced) are printed out, the original editing mode ends.

When the determination section 6A of the controlling unit 6 determines that the number of a page immediately after editing is not specified (step S221; NO), the determination section 6A determines, for example, what is the number of a page immediately before editing (step S225).

When the number of a page immediately before editing is the last page of the job original before editing (step S225; page 10), for example, as shown in FIG. 9A, as the job original-for-editing is composed of "A" and "B", and the number of a page immediately after editing is "x (not specified)", the determination section 6A determines that the editing contents are for processing of adding the job original-for-editing at the end of the job original before editing composed of 10 pages. On the basis of this determination result (editing contents), the editing section 6B of the controlling unit 6 adds the job original-for-editing composed of "A" and "B" after the original image which is page 10 of the job original before editing. Accordingly, the printing machine 1 prints out original images which are pages 1, 2, 3, 4, 5, 6, 7, 8, 9, 10, A, and B as a job original after editing (step S227).

As described above, after the original images partially edited (added) are printed out, the original editing mode ends.

On the other hand, when the number of a page immediately before editing is not the last page of the job original before editing (step S225; page 5), for example, as shown in FIG. 9B, as the job original-for-editing is composed of "A" and "B", and the number of a page immediately after editing is "x (not specified)", the determination section 6A determines that the editing contents are for processing of replacing original images which are pages 6 to 10 of the job original before editing composed of 10 pages with the job original-for-editing.

On the basis of this determination result (editing contents), the editing section 6B of the controlling unit 6 replaces original images after the original image which is page 5 of the job original before editing, with the job original-for-editing composed of "A" and "B". Accordingly, the printing machine 1 prints out original images which are pages 1, 2, 3, 4, 5, A, and B as a job original after editing (step S229).

As described above, after the original images partially edited (added) are printed out, the original editing mode ends.

In any case, the controlling unit 6 makes the storing unit 6C store a job original after editing as a new registered original in a re-printable state, which is reusable at any time.

Moreover, it is possible to renumber the pages of the job original after editing in printing out.

As described above, according to the printing machine 1, to which the image processing machine according to the second exemplary embodiment of the present invention is applied, in a case of editing a part of original images in units of pages, it is possible to reduce user's complicated operations to the utmost and to achieve electric power saving. That is, in a case of printing out original images previously stored, it is possible to automatically perform editing by only specifying editing contents. This reduces works and time required for partial editing of original images for efficiency. In particular, in a case of adding original images that are not in a job original before editing and performing a printout, partial editing of original images is made easy by making use of a plurality of job originals previously stored. There is thus no need of newly reading the whole of the original composed of a plurality of pages. This reduces electric power consumption and is thus economical.

It is noted that there is a case of having a large number of pages and having difficulty to specify editing contents. In such a case, for example, during execution of a job for printing out original images that is an editing object, the controlling unit 6 obtains information regarding the number of pages of sheets P fed to the printing unit 3 in accordance with timing of starting sheet feeding, and displays the number of pages on the displaying unit 10B. At a timing when a page number of the fed sheet P matches a page number of an original image to be partially edited, a user performs a key operation to suspend the job, and performs an interrupt job to print out a new editing image for partial editing. Moreover, at a timing when the interrupt job ends, the controlling unit 6 restarts the suspended job. During execution of the job for printing out original images that are an editing object, by repeating the interrupt job for editing images, it is possible to print out original images previously stored, whose part is edited.

The image processing machine is not limited to the printing machine such as an IJ printer, and is applied to a scanning machine including an operating unit and a storing unit, a copying machine and a facsimile machine including the scanning machine, a digital multifunctional machine (MFP), and the like.

In the first exemplary embodiment, as one method to specify the range of editing, the layout information of image data is used. Instead of this, it may use coordinates data of sequential numbers (page numbers), or a result of character recognition.

Moreover, in the first exemplary embodiment, the controlling unit 6 may display original images after editing on the display unit 10B.

In the first embodiment, the number of pages in the original before editing is set 10. The number of pages in the original before editing is however not limited to this.

The present invention is not limited to the above embodiments and the structural components can be realized by modifying them without departing from the gist at the implementation stage. Moreover, various inventions can be constituted by appropriately combining the various structural components disclosed in the above embodiment. For example, some of the structural components among all the structural components described in the embodiments can be omitted.

What is claimed is:

1. An image processing machine, comprising:
   a reader that reads a set of original images from an original composed of a plurality of pages and reads a set of editing images from an original-for-editing for editing the original;
   a memory that stores the set of original images and the set of editing images read by the reader in units of pages; and
   a processor that when an editing mode to edit the set of original images based on the set of editing images is set, determines whether or not there are original images that correspond to a first editing image which is a first page of the original-for-editing stored in the memory and a last editing image which is a last page of the original-for-editing stored in the memory, among the set of original images stored in the memory, and edits the set of original images using the set of editing images based on a result of the determination.

2. The image processing machine according to claim 1, wherein (i) when the processor determines that there are the original images that correspond to the first editing image and the last editing image among the set of original images stored in the memory and (ii) when the number of total pages of the original-for-editing is two, the processor deletes one or more original images between the original image corresponding to the first editing image and the original image corresponding to the last editing image in the set of original images stored in the memory.

3. The image processing machine according to claim 1, wherein (i) when the processor determines that there are the original images that correspond to the first editing image and the last editing image among the set of original images stored in the memory and (ii) when the number of total pages of the original-for-editing is three or more, the processor replaces one or more original images between the original image corresponding to the first editing image and the original image corresponding to the last editing image in the set of original images stored in the memory, with one or more editing images between the first editing image and the last editing image.

4. The image processing machine according to claim 1, wherein when the processor determines that there is only the original image that corresponds to the first editing image among the set of original images stored in the memory, the processor replaces one or more original images after the original image corresponding to the first editing image in the set of original images stored in the memory, with one or more editing images after the first editing image, and when the processor determines that there is only the original image that corresponds to the last editing image among the set of original images stored in the memory, the processor replaces one or more original images before the original image corresponding to the last editing image in the set of original images stored in the memory, with one or more editing images before the last editing image.

5. The image processing machine according to claim 1, wherein when the processor determines that there is no original images that correspond to the first editing image and the last editing image among the set of original images stored in the memory, the processor adds the set of editing images after the set of original images stored in the memory.

* * * * *